Nov. 25, 1952  C. W. CHILLSON ET AL  2,619,183
AIRCRAFT PROPELLER CONTROL SYSTEM
Filed May 12, 1945  3 Sheets-Sheet 2
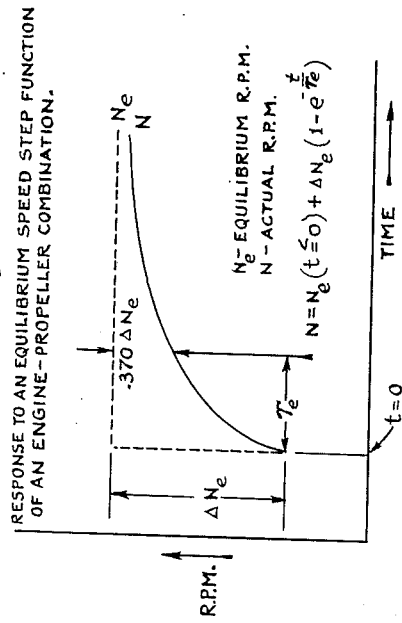
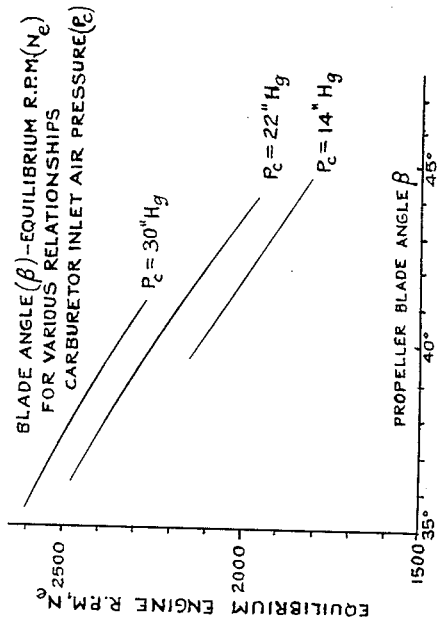
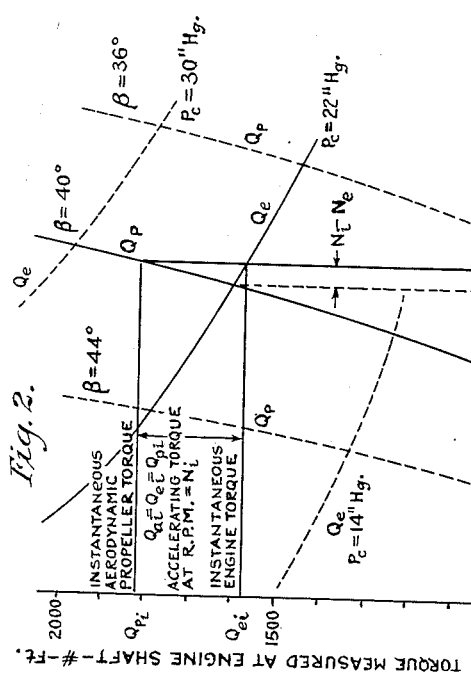
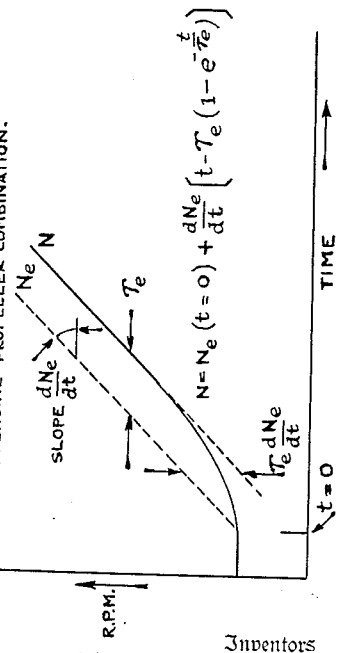
Inventors
Charles W. Chillson
Joseph R. Schoenbaum
Attorney Nov. 25, 1952

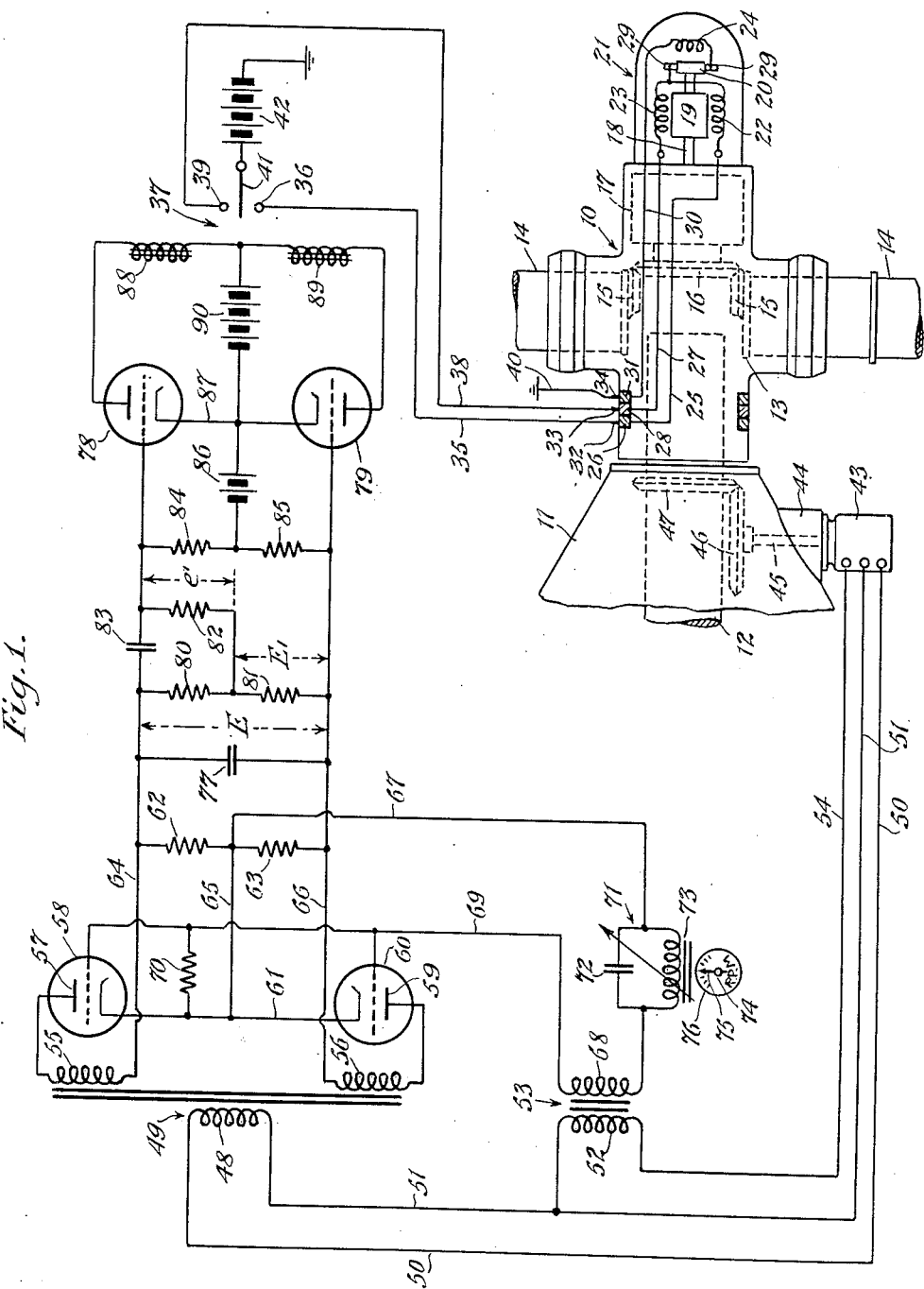

C. W. CHILLSON ET AL 2,619,183

AIRCRAFT PROPELLER CONTROL SYSTEM

Filed May 12, 1945

Inventors
Charles W. Chillson
Joseph R. Schoenbaum

Attorney

Patented Nov. 25, 1952

2,619,183

UNITED STATES PATENT OFFICE 2,619,183

AIRCRAFT PROPELLER CONTROL SYSTEM

Charles W. Chillson, Caldwell, and Joseph R. Schoenbaum, Roseland, N. J., assignors to Curtiss-Wright Corporation, a corporation of Delaware Application May 12, 1945, Serial No. 593,525

17 Claims. (Cl. 170—160.14)

This invention relates to improvements in speed-control systems for prime movers.

One object of the invention is to provide a control system which is electronic in character and hence which eliminates the use of moving parts heretofore considered necessary and in so doing obtains simplicity and economy in design, minimizes mechanical failure, and avoids wear and other losses as a result of friction and lags due to inertia.

A further object is to provide a system which is highly sensitive and which will enable rapid and accurate control of the prime mover.

A still further object is a system wherein provision is made for avoiding over-corrections by, and hence excessive use of, the mechanism which is controlled by the system and which, in turn, controls the prime mover, this object contemplating a system which may be stabilized in various ways to tolerate lags in the response of the prime mover which result from the inertia of the prime mover and its load and which attend changes in the speed of the prime mover and load.

A still further object is to provide a system which responds not only in accordance with the magnitude of the deviation of the prime mover with respect to the desired operating speed but also in accordance with the rate of acceleration of the prime mover when the latter is undergoing changes in its operating level and which, owing to these characteristics, may be adapted with facility to widely different uses.

A still further object is a novel arrangement of the component parts of the system, whereby to facilitate assembling, testing and adjusting operations and reduce and simplify maintenance.

The above and other novel features of the invention will appear more fully hereinafter from the following detailed description when taken in conjunction with the accompanying drawings. It is expressly understood, however, that the drawings are employed for purposes of illustration only and are not designed as a definition of the limitations of the invention, reference being had for this to the appended claims.

The invention is illustrated in the accompanying drawings, wherein:

Figure 1 is a wiring diagram of a control system embodying the features of the invention;

Figure 2 shows graphically typical torque and R. P. M. curves of an engine at various carburetor inlet air pressures with the propeller at various blade angles;

Figure 3 shows a response of an engine-propeller combination to a sudden change in equilibrium speed;

Figure 4 shows a response of an engine-propeller combination to a linear change in equilibrium speed;

Figure 5 shows the equilibrium speed of an engine-propeller combination plotted against blade angle pitch for various carburetor inlet air pressures;

Figure 7:
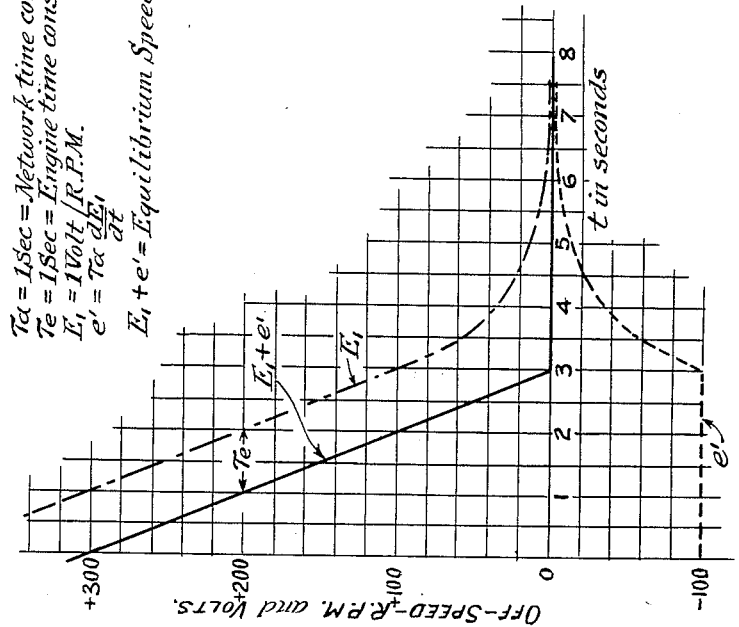
Figure 6:
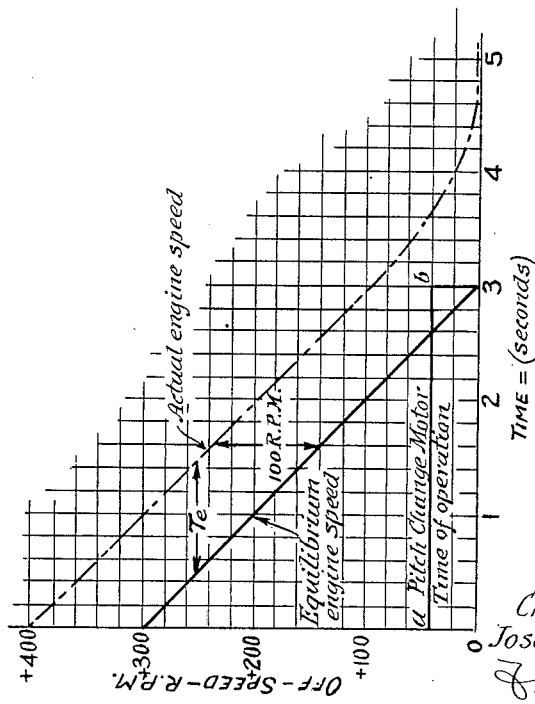

Figure 6 shows graphically a specific relation which may exist between the actual speed of an engine-propeller combination and the corresponding equilibrium speed during a linear change in propeller pitch; and Figure 7 shows graphically the manner in which the characteristic voltages produced by the system are combined to effect control of an engine-propeller combination in the manner desired during such same change in propeller pitch.

In the illustrated embodiment of the invention, the control system is utilized, by way of example, to govern the speed of an engine-propeller combination 10. The engine of the latter is sufficiently indicated for the purpose in view by a showing of the nose section 11 and the drive shaft 12 which extends through the nose section, the hub 13 of the propeller being splined or otherwise secured upon the end of the drive shaft and carrying blades 14. The propeller is of the electric, variable-pitch type, the root ends of the blades being journaled in the hub and carrying bevel gears 15 which mesh with a ring gear 16. The latter is connected through suitable reduction gearing 17 to a shaft 18 which carries the armature 19 and commutator 20 of an electric motor 21, the said motor being reversible, having oppositely wound field coils 22 and 23, and also having a brake-disengaging coil 24. A conductor 25 connects one end of the field coil 22 to a slip ring 26 on the inner end of the propeller hub while a conductor 27 connects the corresponding end of the field coil 23 to a similar slip ring 28, the opposite ends of the two field coils being connected to one of a set of brushes 29. One end of the brake-disengaging coil 24 is connected to the other of the brushes 29 while its opposite end is connected by a conductor 30 to a third slip ring 31. Brushes 32, 33 and 34 cooperate with the slip rings 26, 28 and 31, respectively, a conductor 35 connecting the brush 32 to one contact 36 of a polarized relay 37, a conductor 38 connecting the brush 33 to a second contact 39 of the relay while the brush 34 is grounded by a line 40. A movable contact member 41 of the relay is connected to one side of a battery 42, the other side of which is grounded.

It will thus be apparent that when the contact member 41 engages the contact 36, the field coil 22 of the motor 21 will be energized to cause rotation of the armature of the motor in one direction while when the contact member engages the contact 39 the field coil 23 will be energized to cause rotation of the motor in the opposite direction. The pitch of the blades 14 may, therefore, be increased and decreased by engagement of the contact member 41 with the proper contact, it being noted in this connection that the coil 24 is connected in series with the particular field coil which is energized and hence that the brake, which normally resists rotative movement of the motor armature, is disengaged simultaneously with the energization of either of the field coils so that free rotary movement of the armature will be permitted at such times. Although the electric propeller shown and described is of standard design, it is to be understood that the control system hereinafter described and claimed is not limited to propellers of this or any other particular type.

In order to produce a signal having a frequency which corresponds to, and varies as, the speed of the engine, a two-phase generator 43 is mounted upon a pad, or seat, 44 which is formed, or provided upon, the nose section 11, the rotor shaft 45 of the generator carrying a gear 46 which meshes with a companion gear 47 carried by the drive shaft 12. The generator may be of any suitable type. Preferably, its two windings are 90° out of phase, one phase being connected to the primary 48 of a transformer 49 by lines 50 and 51 while the second phase is connected to the primary 52 of a transformer 53 by the line 51 and a line 54.

The transformer 49 includes two serially-connected secondaries 55 and 56, one side of the former being connected to the anode 57 of an electron tube 58 while the opposite side of the secondary 56 is connected to the anode 59 of a similar tube 60, the two tubes having a common cathode line 61. The secondaries 55 and 56 are connected by a bridge which includes load resistors 62 and 63. The former is included in the anode circuit of the tube 58, one side being connected to the secondary 55 by a line 64 and the other side being connected to the cathode line 61 by a line 65. The load resistor 63 is included in the anode circuit of the tube 60, one side being connected to the secondary 56 by a line 66 while the other side is connected to the cathode line 61 by the line 65.

A continuation 67 of the line 65 is connected to one side of a secondary 68 of the transformer 53. The other side of the secondary 68 is connected by a line 69 to the grids of the tubes 58 and 60 and through a resistance 70 to the cathode line 61, the line 67 including a parallel, resonant circuit 71. The capacity and inductance of the condenser 72 and coil 73, respectively, of the parallel circuit are predetermined so that the circuit will resonate to the frequency of the generator 43 when the engine is turning the drive shaft 12 at the proper speed, the capacity and inductance, either or both, preferably being adjustable so that the parallel circuit may be tuned throughout a resonant range corresponding to the desired operating speed range of the engine. To facilitate this the tuning control 74 may carry an indicator 75 which is adapted to traverse a dial 76 calibrated directly in R. P. M.

From the foregoing, it will be apparent that one phase of the generator frequency is, through the transformer 49, impressed across the anodes of the tubes 58 and 60 while the other phase is utilized to bias the grids of the said tubes. The voltages which are impressed across the anodes 57 and 59 are, therefore, 180° out of phase when the parallel circuit 71 is resonant. The voltage on the grid of the tube 58 then leads the voltage on the anode 57 by 90° while the voltage on the grid of the tube 60 lags the voltage on the anode 59 by 90°. Under such circumstances, the flow of current through the anode circuits of the tubes 58 and 60 will be equal, as will the voltages across the load resistors 62 and 63. Hence the net voltage across the lines 64 and 66 will be zero. Any change in the generator frequency, however, assuming the tuning of the parallel circuit remains the same, will result in a phase shift in the parallel circuit, and hence will cause an unequal phase relationship to exist between the grids of the tubes 58 and 60 and the respective anodes. The flow of current through the anode circuits of the two tubes will change accordingly, as will the voltages across the resistors 62 and 63. A differential existing between the voltages across the resistors 62 and 63, there will be a voltage drop across the lines 64 and 66 equal to such difference, the polarity of the lines and the magnitude of the voltage drop depending, respectively, upon whether the generator frequency is higher or lower than the resonant frequency of the parallel circuit and upon the magnitude of the frequency deviation.

Thus, the net voltage across the lines 64 and 66 may be caused to vary over a predetermined range directly as the difference between the generator frequency and the resonant frequency of the parallel circuit, the voltage drop being in one sense when the generator frequency is higher than the resonant frequency of the parallel circuit and in the opposite sense when the generator frequency is lower. As the resonant frequency of the parallel circuit 71 corresponds to the desired speed of the engine and as the frequency of the generator 43 corresponds to the actual speed, the voltage across the lines 64 and 66 will be proportional to off-speed variations of the engine.

The linear range over which off-speed voltages may be obtained in the manner described is dependent upon the voltage and power output of the generator 43 and upon the "Q" of the resonant circuit 71. When sensitivity is of more importance than the range of linearity, the said circuit should have a high "Q" whereas if a wide linear range is of more importance than sensitivity, a resonant circuit of relatively low "Q" should be employed. In this connection it is to be understood that, if desired, a series resonant circuit may be substituted for the parallel circuit for phase shifting purposes and that a condenser 77 may be connected across the lines 64 and 66 to attenuate the undesirable high frequencies.

The lines 64 and 66 also serve as the output lines of this section of the control system, the former being connected to the control grid of a relay tube 78 while the latter is connected to the control grid of a similar tube 79. In accordance with the invention, serially-connected load resistances 80 and 81 are connected across the lines 64 and 66 so that a voltage will appear across the resistance 81 which will be proportional to the total voltage drop E across the said lines, and hence to the off-speed of the engine. A resistance 82, having one side connected to the line 64, is connected through the resistance 81 to the line 66, a condenser 83 in the line 64 and the resistance 82 being in series and, as a series, being in parallel with the resistance 80.

It will thus be apparent that the voltage across the lines 64 and 66 at the points to which the resistances 82 and 81, respectively, are connected, and hence the signal voltage which will be impressed upon the grids of the tubes 78 and 79, will be the sum of the voltages across the said resistances. As noted, the voltage across the resistance 81 is proportional to engine-off-speed and is zero when the engine is on-speed. A voltage appears across the resistance 82, however, only when the speed of the engine is changing, the magnitude of such voltage being approximately proportional within the limitations imposed by the circuit values to the rate of acceleration and the polarity being in one sense when the acceleration is positive and in the opposite sense when the acceleration is negative. Any voltage developed across the resistance 82 will, therefore, be added to or subtracted from the voltage across the resistance 81, depending upon whether the engine speed is increasing or decreasing, preferably being added when the engine speed is being increased above reference speed and subtracted when the engine speed is being reduced towards the reference speed. The resistances 81 and 82, acting conjointly, thus provide a signal voltage for the grids of the tubes 78 and 79, one component of the signal voltage being proportional to, and of the same sign as, the off-speed of the engine and the second component being approximately proportional to, and of the same sign as, the rate of acceleration of the engine.

Serially-connected bias resistors 84 and 85 for the grids of the tubes 78 and 79, respectively, are connected across the lines 64 and 66, a battery 86, which is connected between the resistors and the cathode line 87 of the tubes, providing a fixed bias for the tubes. The anode circuit of the tube 78 includes a coil 88 of the relay 37 while the anode circuit of the tube 79 includes a similar coil 89, a battery 90 furnishing current for the anode circuits. Both tubes are similarly biased so that when the signal bias is zero (the engine being on-speed and not changing speed) the flow of current through the anode circuits will cause the coils 88 and 89 to oppose one another in such a manner that the contact member 41 of the relay 37 will be held in the neutral position shown, out of engagement with the contacts 36 and 39. The pitch-change motor 21 will remain deenergized at such times. As soon, however, as the grids of the tubes 78 and 79 are biased to a different degree the flow of current through the relay coils 88 and 89 will no longer be uniform and the contact member 41 will be moved into engagement with one of the contacts 36 and 39 to cause the pitch-change motor 21 to be energized in the manner described.

In the theoretical treatment of the dynamics of an engine-propeller combination, air speed and altitude are assumed constant. This assumption is generally acceptable when considering control system stability. As shown in Figure 2, with an air speed and altitude specified, there will be an equilibrium speed ($N_e$) of the engine for any given combination of propeller blade angle ($\beta$) and engine carburetor inlet air pressure ($P_c$). This equilibrium speed will be reached when the blade angle and carburetor inlet air pressure have been maintained constant long enough for inertia effects to have been overcome. The equilibrium speed may be determined from the following normally available data, typical values of which are shown in the figure: (1) a plot of engine torque versus R. P. M. for the specified carburetor pressure at the specified altitude, and (2) a plot of the torque required to drive the propeller versus R. P. M. for the specified blade angle at the specified air speed and altitude.

If, for instance, the carburetor inlet air pressure ($P_c$) is 22" Hg and the blade angle ($\beta$) is 40°, the equilibrium speed is $N_e$, that being the speed at which the torque available and the torque required are equal.

Corrections in pitch instituted by the governor do not immediately produce the equilibrium speed corresponding to the new blade angle setting. The inertia of the propeller and engine causes a time lag. Time lags in this type of governed system are a primary source of instability in that changes in the governed quantity continue after a simple speed sensitive governor ceases to call for them. Of the several satisfactory methods currently employed to stabilize such systems, none are ideal and all are affected in some degree by the existence of this unavoidable delay between the time a change is instituted and the time the effects of this change are complete and can be detected by the governor. In studying quantitatively the response to pitch change, it has been found convenient to express this time lag in terms of the "characteristic time" ($\tau_e$) of the system. This may be explained by the following derivation and further reference to Figure 2.

Consider an instantaneous condition where the speed is $N_i$. Propeller aerodynamic torque is $Q_{pi}$ while engine torque is $Q_{ei}$. If the difference from equilibrium conditions is small, the curves can be considered as straight lines and a proportionality factor ($K_p$) can be simply obtained which expresses the accelerating torque available to overcome the inertia ($I_p$) of the rotating parts of the engine and propeller in terms of lbs. per ft. torque per R. P. M. deviation from equilibrium speed:

$$Q_{ai}=Q_{ei}-Q_{pi},\ K_p=\frac{Q_{ai}}{N_e-N_i} \qquad (1)$$

The acceleration is given by the relation:

$$\frac{dw}{dt}(\text{radians/sec})=\frac{2\pi}{60}\frac{dN}{dt}(\text{R. P. M./sec})=\frac{Q_{ai}}{I_p} \qquad (2)$$

Combining (1) and (2):

$$\frac{dN}{dt}=\frac{60}{2\pi}\frac{K_p}{I_p}(N_e-N_i) \qquad (3)$$

The "characteristic time" ($\tau_e$) can be defined as follows:

$$\tau_e=\frac{2\pi}{60}\frac{I_p}{K_p}\ (\text{seconds}) \qquad (4)$$

and relation (3) becomes (dropping the subscript "$i$")

$$\frac{dN}{dt}=\frac{1}{\tau_e}(N_e-N) \qquad (5)$$

where N refers to the actual engine speed at any instant of time. A sudden change in the "equilibrium speed" ($N_e$) in the engine-propeller would result in a change in engine speed (N) varying with time as shown in Figure 3; it is immaterial as to what causes the equilibrium speed change. Figure 4 shows the parallel case of response when the equilibrium speed suddenly begins to change at a constant rate.

This rate, if a result of pitch change, is determined by the aero-dynamic sensitivity of the propeller expressed in terms of the change in equilibrium speed per degree of blade angle and by the rate of blade angle change. Cross plotting the curves of $Q_e$ and $Q_p$ in Figure 2 gives a plot as shown in Figure 5 from which the aero-dynamic sensitivity can be obtained. The rate of blade angle change is a function of the pitch-changing mechanism characteristics and those of the control. The general shape of the curves shown for the aerodynamic sensitivity are typical. The sensitivity to pitch change decreases at larger blade angles and at increased power loadings. In a typical 1000 H. P. installation it might vary between 40 and 200 engine R. P. M./degree of blade angle change.

In general, the characteristic time ($\tau$) is a measure of the delay in response to equilibrium speed changes. In the case of the engine and propeller, it will tend to increase as the physical size of the units becomes greater. It will generally be higher at the lower air speeds, at increased altitudes and at lower carburetor pressures. In a typical installation, the characteristic time might vary over the range of flight conditions from .15 to .60 second.

A specific example is illustrated in Figure 6 wherein by virtue of an increase in the power output of the engine the engine-speed is shown to be off 400 R. P. M. with respect to the governed, or on-speed mark. Assuming the engine-propeller time constant $\tau_e$ to be one second, it will be noted that operation of the pitch-change motor for the interval $a$—$b$ is required to bring the engine on-speed. As the engine is reduced in speed by increasing the pitch of the propeller, the actual engine speed, owing to inertia, lags the equilibrium speed by one second, or 100 R. P. M. Hence, if the pitch-change motor is rendered non-operative, as shown, at the instant the equilibrium speed of the engine reaches the on-speed mark, the engine speed will advance to on-speed as it seeks an equilibrium speed, it being noted in this connection that if the pitch-change motor is operated until the speed of the engine reaches the on-speed mark, over-correction will result and additional operations of the pitch-change motor will be necessitated.

It will be apparent from the foregoing, that as the engine speed lags the equilibrium speed while the engine is undergoing a change in speed, the voltage $E_1$ across the resistance 81, being proportional only to engine off-speed, will also lag the equilibrium speed. The lag between the engine speed and the equilibrium speed is, however, compensated by the voltage $e'$ across the resistance 82, the latter and the condenser 83 providing an acceleration-sensitive network having a time constant $\tau_a$ bearing such a relation to the time constant of the engine-propeller combination that the relay for controlling the pitch-change motor may be controlled in accordance with the equilibrium speed of the engine-propeller combination instead of the actual speed.

The action of the acceleration-sensitive network is illustrated in Figure 7. The various curves shown represent the response of an engine-propeller combination to the control system as the latter brings on-speed an engine-propeller combination which is off-speed by 400 R. P. M. This is accomplished by operation of the pitch-change motor during the period 0 second to 3 seconds, the deceleration of the engine-propeller combination being at the rate of 100 R. P. M./sec. It will be noted that as a result of such deceleration the voltage across the resistance 82 which is equal to $$\tau_a \frac{dE_1}{dt}$$

has risen to its full value but, being negative, is substracted from the off-speed voltage $E_1$. The time constant of the acceleration-sensitive network, however, is predetermined with such relation to the time constant of the engine-propeller combination that at the instant the equilibrium speed reaches the on-speed level (at 3 seconds) the voltage $e'$ across the resistance 82 is equal and opposite to the voltage $E_1$ across the resistance 81. Hence the contact member 41 of the relay 37 will move to its neutral position and the pitch-change motor will be rendered non-operative. Thereafter, as the engine-propeller combination progresses to the equilibrium speed, the voltages across the resistances 81 and 82 decay exponentially along uniform curves as clearly shown in Figure 7. The contact member 41 of the relay 37 will, therefore, remain in its neutral position during such period and for so long a period thereafter as the engine-propeller combination remains on-speed.

From the foregoing it will be apparent that, in the simplified embodiment described, the system is operative to control an engine-propeller combination in accordance with its equilibrium speed. Over-correction, with attendant hunting and excessive use of the pitch-change motor, is thus avoided while the time required to effect a desired correction is reduced. In this connection it will be noted, (1) that the pitch of the propeller will be corrected whenever the engine speed deviates a predetermined extent from its on-speed level, regardless of the rate of departure, (2) that the pitch will be corrected whenever the engine accelerates or decelerates at a rate greater than a predetermined rate, even though it may be on-speed when such correction is initiated, and, (3) in instances in which the rate of acceleration of the engine-propeller combination in the direction of the on-speed level is such that the equilibrium speed will exceed such level, the voltage across the resistance 82 being greater than that across the resistance 81 at such times, the relay will be actuated to reverse the pitch-change motor even though such reversal is counter to the action indicated by the off-speed voltage. The system, therefore, has the advantage that it is highly flexible and will enable stable control under various operating conditions.

The acceleration-sensitive network illustrated is intended by way of example only. Any other suitable network, or means, which will respond in the manner described to changes in the speed of the engine-propeller combination, or other controlled apparatus, may be substituted for the network shown, if desired. It will also be apparent that the acceleration-sensitive portion of the circuit will provide a stabilizing effect even though the exact relationships shown by way of illustration and explanation are not realized. The values shown correspond to a system which is somewhat more than critically damped. By modifying the circuit values, the magnitude of the voltage appearing across resistor 82 for a given rate of acceleration can be adjusted to give either under or over-damping. The preceding explanation has covered a specific over-damped case to simplify presentation. In practice, partly to assist in getting the engine on-speed with a minimum of delay and partially to allow for and minimize the effect of the fact that the acceleration-sensitive network is not ideal, it may be found desirable to adjust the circuit constants to give an intermediate amount of damping which will give optimum average operation over the variations of $\tau_e$ normally encountered over the range of operating conditions involved in an actual installation.

The control system shown and described is intended only as one practical application of the invention, and though it has been illustrated in conjunction with a prime mover and the variation of a variable pitch propeller to maintain a constant speed, its application to other speed control problems, where accuracy and avoidance of hunting are desirable, will appear obvious to those skilled in the art. For example, a steam turbine may be speed controlled by controlling the actuation of its throttle valve, or the oven temperature of a piezo frequency control crystal may be maintained constant. In either case, the operating level to be maintained is the rotation speed or the desired frequency. It is understood, therefore, that the invention is not limited to the illustrated example but may be embodied in various modifications, arrangements and combinations, which may be made without departing from the spirit of the invention as will be apparent to those skilled in the art. Accordingly, reference will be had to the appended claims for a definition of the limits of the invention.

What is claimed as new and desired to be secured by Letters Patent, is:

1. A system for controlling the speed of a power plant including a propeller having a pitch changing mechanism, the blades of the propeller being adjustable as to pitch and actuated by said mechanism, said system including means establishing a datum speed, means for producing a force of a magnitude characteristic of the speed error of said power plant from the datum speed, means for correcting the amount of said error force to compensate for the lag in the response of said power plant, and means responsive to said force, as corrected, for rendering said mechanism non-operative before said power plant attains said predetermined speed level.

2. A system for controlling the speed of a power plant including a propeller having a pitch changing mechanism, the blades of the propeller being adjustable as to pitch and actuated by said mechanism, said system including means establishing a datum speed, means for producing a force of a magnitude characteristic of the speed error of said power plant from the datum speed, means for producing a second force, means for combining said second force with said first mentioned force to compensate for the lag in the response of said power plant, and means responsive to the combined forces for rendering said mechanism non-operative when said power plant attains such a speed that it will seek an equilibrium level at said datum speed.

3. A system for controlling the speed of a power plant including a propeller having a blade pitch changing motor, the blades of the propeller being adjustable as to pitch and actuated by said mechanism, said system including means establishing a datum speed, means for producing a voltage characteristic of the speed error of said power plant from the datum speed, means for producing a second voltage, a time-delay circuit through which said second voltage may be combined with said first mentioned voltage to compensate for the lag in the response of said power plant, and means responsive to the combined voltages for rendering said mechanism non-operative when said power plant attains a speed bearing such a relation to the datum speed that it will seek the latter speed as it is permitted to gain an equilibrium level.

4. A system for controlling the speed of a power plant including a propeller having a blade pitch changing mechanism, the blades of the propeller being adjustable as to pitch and actuated by said mechanism, said system including means establishing a speed datum, means which is responsive to off-speed of said power plant from the datum speed and productive of a speed error signal, means which is responsive to the acceleration of said power plant and productive of an acceleration signal, and means operated by said last two mentioned signals for controlling the operation of said mechanism, whereby to govern the speed of said power plant by varying the pitch of said blades.

5. A system for controlling the speed of a power plant including a propeller having a blade pitch changing mechanism, the blades of the propeller being adjustable as to pitch and actuated by said mechanism, said system including means establishing a speed datum, means for producing a voltage having a component which is substantially proportional to the off-speed of said power plant from the datum speed and a component which is substantially proportional to the rate of acceleration of said power plant, and means actuated by said voltage for controlling the operation of said mechanism, whereby to govern the speed of said power plant by varying the pitch of said blades.

6. A system for controlling the speed of a power plant including a propeller having a blade pitch changing mechanism, the blades of the propeller being adjustable as to pitch and actuated by said mechanism, said system including means establishing a speed datum, means for producing a force proportional to the off-speed of said power plant from the datum speed, means for producing a second force which is proportional to the rate of acceleration of said power plant, and means actuated by both said forces for controlling the operation of said mechanism, whereby to govern the speed of said power plant by varying the pitch of said blades.

7. A system for controlling the speed of a power plant including a propeller having a blade pitch changing motor, the blades of the propeller being adjustable as to pitch and actuated by said mechanism, said system including means establishing a speed datum, means for producing a voltage which is proportional to, and which has the same sign as, the off-speed of said power plant from the datum speed, means for producing a second voltage which is proportional to, and which has the same sign as, the rate of acceleration of said power plant, and means actuated by said voltages for controlling the operation of said mechanism whereby to govern the speed of said power plant by varying the pitch of said blades.

8. A system for controlling the speed of a power plant including a propeller having a blade pitch changing mechanism, the blades of the propeller being adjustable as to pitch and actuated by said mechanism, said system including means establishing a speed datum, means for producing a voltage which is proportional to, and which has the same sign as, the off-speed of said power plant from the datum speed, means for producing a second voltage which is proportional to, and which has the same sign as, the rate of acceleration of said power plant, and means actuated by the combined voltages for controlling the operation of said mechanism whereby to govern the speed of said power plant by varying the pitch of said blades, said voltages being substantially equal and opposite when the equilibrium speed of said power plant corresponds to the desired speed.

9. A system for controlling the speed of a power plant including a propeller having a blade pitch changing mechanism, the blades of the propeller being adjustable as to pitch and actuated by said mechanism, said system including means establishing a speed datum, means for producing a voltage which is proportional to, and which has the same sign as, the off-speed of said power plant from the datum speed, circuit means for producing a second voltage which is proportional to, and which has the same sign as, the rate of acceleration of said power plant, and means actuated by both said voltages for controlling the operation of said mechanism, whereby to govern the speed of said power plant by varying the pitch of said blades, said second circuit means including the characteristic of a lag, in development of the second voltage, which bears such a relation to the lag of said power plant that said first and second voltages are substantially equal and opposite when the equilibrium speed of said power plant corresponds to the desired speed and the voltages decaying along similar exponential curves as said power plant approaches said desired speed.

10. A system for controlling the speed of a power plant including a propeller having a blade pitch changing mechanism, the blades of the propeller being adjustable as to pitch and actuated by said mechanism, said system including means establishing a speed datum, means for producing a voltage which is proportional to, and which has the same sign as, the off-speed of said power plant from the datum speed, means for producing a second voltage which is proportional to, and which has the same sign as, the rate of acceleration of said power plant, a relay for controlling the operation of said mechanism, whereby to govern the speed of said power plant by varying the pitch of said blades, and electron tube circuits actuated by said first and second voltages for actuating said relay.

11. A system for controlling the speed of a power plant including a propeller having a blade pitch changing mechanism, the blades of the propeller being adjustable as to pitch and actuated by said mechanism, said system including means establishing a datum speed, means for producing a voltage proportional to the off-speed of said power plant from the datum speed, means for increasing and decreasing said voltage, actuated by the power plant when the speed of the power plant is respectively higher or lower than the desired speed, to compensate for the lag between the actual speed of the power plant and the equilibrium speed during changes in speed, and means actuated by said voltage for controlling the operation of said mechanism, whereby to govern the speed of said power plant by varying the pitch of said blades.

12. A system for controlling the speed of a power plant including a propeller having a blade pitch changing mechanism, the blades of the propeller being adjustable in either direction as to pitch and actuated by said mechanism, said system including means establishing a datum speed, means for producing a voltage which is proportional to, and which has the same sign as, the off-speed of said power plant from said datum speed, means for producing a second voltage of a magnitude which may be less than or greater than said first voltage and which is proportional to, and which has the same sign as, the rate of acceleration of said power plant, and means actuated by the combined voltages in opposition for controlling the operation of said mechanism in either direction, whereby to govern the speed of said power plant by varying the pitch of said blades, said voltages being substantially equal and opposite when the equilibrium speed of said power plant corresponds to the desired speed.

13. A system for controlling the speed of a power plant including a propeller having a blade pitch changing mechanism, the blades of the propeller being adjustable in either direction as to pitch and actuated by said mechanism, said system including means establishing a datum speed, means for producing a voltage which is proportional to, and which has the same sign as the off-speed of said power plant, circuit means for producing a second voltage of a magnitude which may be less than or greater than said first voltage, which is proportional to, and which has the same sign as the rate of acceleration of said power plant, and means actuated by said voltages in opposition for controlling the operation of said mechanism in either direction, whereby to govern the speed of said power plant by varying the pitch of said blades, said circuit means including the characteristic of a lag which bears such a relation to the lag of said power plant that said first and second voltages are substantially equal and opposite when the equilibrium speed of said power plant corresponds to the desired speed and the voltages decaying along similar exponential curves as said power plant approaches said desired speed.

14. A speed control system for a prime mover comprising a prime mover and a variable pitch propeller driven thereby, means for gradually varying the propeller pitch to effect gradual changes in speed of said prime mover, means for creating a voltage for controlling said propeller for increasing or decreasing the propeller pitch gradually and causing the speed of said prime mover to decrease or increase, means responsive to the actual speed of said prime mover and a selected reference speed for so applying said voltage as to vary the propeller pitch in one direction to cause the speed of said prime mover to approach said selected speed, and means responsive to the rate of approach to said selected speed for applying an opposing voltage adapted to neutralize said first named voltage before said selected speed is obtained and adapted to overcome said first named voltage and provide a voltage of opposite sign upon a rate of approach so high as to cause the prime mover to approach and pass said selected speed.

15. A speed control system for a prime mover comprising a prime mover and a variable pitch propeller driven thereby, means for gradually varying the pitch of said propeller to vary the load of said prime mover to effect changes in speed of said prime mover, means for creating a force for controlling the pitch varying means for increasing or decreasing said pitch gradually and causing the speed of said prime mover to decrease or increase in lagging relation to said load varying means, means to determine the actual speed of said prime mover, means establishing a selected reference speed, means producing an error signal which is the difference between actual and reference speed and actuated by said speed measuring means and by said reference speed means, means actuated by said error means for so applying said force as to vary the pitch in a direction to vary the load to cause the speed of said prime mover to approach said selected speed, and means actuated by the rate of approach to said selected speed for applying a counterforce adapted to neutralize said force so applied before said selected speed is obtained and adapted to overcome said force to provide a force oppositely applied to vary the pitch in an opposite direction upon a rate of approach to said selected speed so high as to cause the prime mover to approach and pass said selected speed.

16. A system for controlling the speed of a power plant including a propeller having a pitch changing mechanism, the blades of the propeller being adjustable in pitch by said mechanism to change power plant speed from one level to another, means to establish a desired datum speed, means to provide a speed error signal actuated by the datum means and the actual speed of the power plant, means providing a signal which is a function of the rate of acceleration of the power plant, and means operated by the combined speed error and acceleration signals for controlling the actuation of said pitch changing mechanism.

17. A system for controlling the speed of a power plant including a propeller having a pitch changing mechanism, the blades of the propeller being adjustable in pitch by said mechanism to change the power plant speed from one level to another, means to establish a desired datum speed, means for comparing the datum speed and actual speed providing a speed error signal, means for correcting said error signal to compensate for the lag in the response of said power plant in reaching the datum speed, and means responsive to the corrected signal for actuating said mechanism whereby on cessation of said signal said mechanism becomes non-operative before said power plant attains the datum speed.

CHARLES W. CHILLSON.
JOSEPH R. SCHOENBAUM.

REFERENCES CITED

The following references are of record in the file of this patent:

UNITED STATES PATENTS

| Number | Name | Date |
|---|---|---|
| 1,703,280 | Minorsky | Feb. 26, 1929 |
| 1,988,458 | Minorsky | Jan. 22, 1935 |
| 2,175,009 | Anderson | Oct. 3, 1939 |
| 2,251,973 | Beale | Aug. 12, 1941 |
| 2,270,414 | Canetta et al. | Jan. 20, 1942 |
| 2,346,856 | Martin | Apr. 18, 1944 |
| 2,351,079 | Strobel | June 13, 1944 |
| 2,375,429 | Martin | May 8, 1945 |
| 2,382,847 | Baumann | Aug. 19, 1945 |
| 2,390,084 | Edwards | Dec. 4, 1945 |
| 2,399,685 | McCoy | May 7, 1946 |
| 2,408,451 | Sorenson | Oct. 1, 1946 |

OTHER REFERENCES

"Electronics," Nov. 1944 issue, page 138, article by Clarke.